UNITED STATES PATENT OFFICE 2,615,028

STABILIZATION OF FURFURAL WITH DIMETHYLFORMAMIDE

Sherwood C. Samuels, Jr., Bartlesville, Okla., assignor to Phillips Petroleum Company, a corporation of Delaware No Drawing. Application July 25, 1950, Serial No. 175,857

4 Claims. (Cl. 260—345)

This invention relates to the stabilization or inhibiting of furfural against its condensation. In one of its aspects the invention relates to the use of an inhibitor novel for this purpose. In another of its aspects the invention relates to a stabilized composition of furfural and a stabilizer or inhibitor which renders the composition stable or inhibited against condensation of the contained furfural.

Furfural is a useful solvent for solvent extraction and extractive distillation, and is commonly used in processes such as separation of light hydrocarbons by extractive distillation and in the separation of heavier hydrocarbons by selective solvent extraction. Due to its excellent properties in effecting these separations, furfural has been widely applied in industry.

One disadvantage of furfural in these applications, however, is caused by the condensation or polymerization of furfural to form heavy products which are undesirable in the solvent and must be separated and discarded. This condensation causes a high loss of furfural, which must be replaced, and consequently poses a costly problem. As this condensation increases with increasing temperature, the loss of furfural owing to its condensation becomes exceedingly high at the higher temperatures such as 300 to 500° F.

There has been disclosed in the art a number of nitrogen containing compounds such as certain amides, amines and heterocyclic compounds as furfural condensation or polymerization inhibitors. Certain of the compounds falling into the general classes of materials which indeed include a large number of possibilities, have been tested and found to be ineffective for the stabilization of furfural against condensation or polymerization. Also, the art teaches that one cannot and should not attempt to assume that all the compounds of any given class will be operative as furfural inhibitors. One of the compounds which is reported to be ineffective as a furfural stabilizer is formamide.

According to the present invention it has been found that dimethyl-formamide is an effective inhibitor for the condensation or polymerization of furfural.

Thus, when employed in concentrations of 0.01 to 0.4, preferably 0.05 to 0.2, weight per cent, dimethylformamide has reduced condensation losses up to fifty per cent or more.

Dimethylformamide may be employed in substantially all the applications of furfural wherein the inhibitor does not exert a deleterious effect. This inhibitor may also be present in the furfural during storage in order to cut down losses during storage periods. This inhibitor is especially applicable for use in selective solvent extraction of hydrocarbons, such as gasoline fractions, naphthas, kerosene, and gas oil.

EXAMPLE

In order to test the present inhibitor, mixtures of furfural plus inhibitor and mixtures of gas oil, furfural, and inhibitor were placed in a stainless steel bomb and the sealed bomb then placed in a steel block maintained at 500° F. for periods of 6 and 12 hours. Comparative data were also obtained with uninhibited furfural and with uninhibited mixtures of furfural and gas oil. The gas oil was an aromatic extract of catalytic gas oil and was present in a volume equal to that of the furfural. The furfural used was a commercial product which was distilled prior to use in these tests. The following table gives the results of the tests. The inhibitor as shown in the table was used in amounts of 0.05 to 0.5 weight per cent of the furfural. The figures for furfural loss are in per cent.

Table
FURFURAL LOSS (WEIGHT PERCENT)

| Hours | Furfural Alone | Inhibited Furfural | Furfural plus Gas Oil | Inhibited Furfural plus Gas Oil |
|---|---|---|---|---|
| 6 | 2.3 | (0.05 wt. percent) | 5.4 | (0.05 wt. percent) |
| 12 | 4.0 | 2.2 | 9.6 | 4.9 |
| 12 | | | | (0.1 wt. percent) 5.3 |
| 12 | | (0.2 wt. percent) 4.5 | | (0.2 wt. percent) 7.6 |
| 12 | | | | (0.5 wt percent) 10 |

It is seen from these results that substantial decreases in furfural polymerization were effected where the inhibitor was employed at those concentrations of less than 0.5 weight per cent of the furfural in the presence of the hydrocarbon. It is also evident from these data that the inhibitor is effective in the case of furfural alone; but that for storage of furfural out of contact with hydrocarbon, the inhibitors concentration should not exceed 0.2 weight per cent of the furfural.

Reasonable variation and modification are possible within the scope of the foregoing disclosure and the appended claims to the invention the essence of which is that dimethylformamide has been found to be effective as a furfural stabilizer and that a stabilized furfural composition suitable for wide application in industry and otherwise has been set forth notwithstanding that formamide has been taught to be ineffective as an inhibitor for furfural and has actually been found to be such.

I claim:

1. A method for inhibiting furfural against its condensation which comprises adding to it 0.01–0.4 weight per cent of dimethylformamide.
2. A method for inhibiting furfural against its condensation which comprises adding to it 0.05 to 0.2 weight per cent of dimethylformamide.
3. Furfural containing 0.01 to 0.4 weight per cent of dimethylformamide.
4. Furfural containing 0.05 to 0.2 weight per cent of dimethylformamide.

SHERWOOD C. SAMUELS, Jr.

REFERENCES CITED

The following references are of record in the file of this patent:

UNITED STATES PATENTS

| Number | Name | Date |
|---|---|---|
| 2,384,238 | Comstock | Sept. 4, 1945 |